United States Patent [19]

Nakagome et al.

[11] Patent Number: 4,509,334
[45] Date of Patent: Apr. 9, 1985

[54] MAGNETIC REFRIGERATOR

[75] Inventors: Hideki Nakagome, Yokohama; Satoshi Yasuda, Kawasaki, both of Japan

[73] Assignee: Tokyo Shibaura Denki Kabushiki Kaisha, Kawasaki, Japan

[21] Appl. No.: 497,233

[22] Filed: May 23, 1983

[30] Foreign Application Priority Data

Aug. 31, 1982 [JP] Japan .................................. 57-150939

[51] Int. Cl.³ .............................................. F25B 9/00
[52] U.S. Cl. ............................................. 62/6; 62/3; 165/104.21
[58] Field of Search ...................... 62/3, 6; 165/104.21

[56] References Cited

U.S. PATENT DOCUMENTS

| | | | |
|---|---|---|---|
| 4,033,734 | 5/1977 | Steyert, Jr. et al. | 62/3 |
| 4,107,935 | 8/1978 | Steyert, Jr. | 62/3 |
| 4,332,135 | 6/1982 | Barclay et al. | 62/3 |

OTHER PUBLICATIONS

Cryogenics, Oct. 1981, pp. 579-584, C. Delpuech et al., "Double Acting Reciprocating Magnetic Refrigerator: First Experiments".

Primary Examiner—Ronald C. Capossela
Attorney, Agent, or Firm—Oblon, Fisher, Spivak, McClelland & Maier

[57] ABSTRACT

A working material used in a magnetic refrigerator radiates heat when it is magnetized and absorbs heat when it is demagnetized. The working material is cylindrical and extends vertically. A heat pipe has a cylindrical internal space directly surrounding the peripheral surface of the working material and containing helium gas as a heat medium. The peripheral surface of the working material in contact with the internal space functions as a condensing surface of the heat pipe. A superconductive coil surrounds the working material and intermittently applies a magnetic field thereto. A refrigerator unit supplies a cooling space with helium gas at 20° K. or below. The helium gas from the refrigerator unit removes heat produced from the working material when it is adiabatically magnetized by the coil. When the working material is adiabatically demagnetized, it rapidly absorbs heat to cool the helium gas in the internal space of the heat pipe. The helium gas condenses on the peripheral surface of the working material, and falls in drops into the internal space to be stored at the lower end portion thereof. Thus, heat is transferred in one direction or upward in the heat pipe.

17 Claims, 3 Drawing Figures

MAGNETIC REFRIGERATOR

BACKGROUND OF THE INVENTION

This invention relates to a magnetic refrigerator using a working material which radiates heat when it is magnetized and absorbs heat when it is demagnetized.

Magnetic refrigerators are based on the well-known phenomenon that working materials consisting of rare-earth metal compounds, such as gadolinium-gallium-garnet ($Gd_3Ga_5O_{12}$, abbreviated GGG), or alloys, such as an alloy of erbium and nickel, radiate heat when they are magnetized and absorb heat when they are damagnetized. The temperature of the working material is lowered by adiabatic demagnetization. The working material lowered in temperature extracts heat from an object to cool it. These magnetic refrigerators have an advantage over conventional gas refrigerators in having improved refrigerating capacity per unit volume of the object for cooling.

The magnetic refrigerators require two heat exchanging processes to be executed alternately; a heat discharging process for discharging heat generated from a magnetic material or working material by adiabatic magnetization, and a heat absorption process for extracting heat from the object by means of the working material cooled by adiabatic demagnetization. To obtain a high-efficiency refrigerating cycle through the two alternating heat exchanging processes, it is necessary to securely prevent heat transfer from the working material to the object in the heat discharging process, and to quickly transfer heat from the object to the working material in the heat absorption process.

A prior art magnetic refrigerator is provided with chambers for individually executing the heat discharging and absorption processes so that the working material alternately enters the chambers. For efficient heat exchange, it is necessary to fully maintain the airtightness between the working material and chambers. In practice, however, it is technically difficult to securely seal the working material and the chambers. Insufficient sealing leads to a reduction in refrigerating efficiency. Moreover, the need of a transfer mechanism for the working material complicates the construction of the refrigerator.

SUMMARY OF THE INVENTION

An object of this invention is to provide a magnetic refrigerator capable of heat exchange without moving a working material and having improved refrigerating efficiency.

Another object of the invention is to provide a magnetic refrigerator obviating the necessity of a transfer mechanism for a magnetic material and being simplified in construction.

A magnetic refrigerator for cooling an object according to this invention comprises a working material which radiates heat when it is magnetized and absorbs heat when it is demagnetized, and magnetic field generating means for selectively applying or removing a magnetic field to or from the working material. At least one heat pipe is disposed between the working material and the object for cooling. The heat pipe has an internal space in which heat is transferred from the object for cooling to the working material. The magnetic refrigerator further comprises heat absorbing means for absorbing the heat radiated from the working material when the working material is magnetized.

According to this invention, the directional heat pipe is disposed between the working material and the object for cooling, and functions as a thermoswitch to allow heat to be transferred from the object to the working material but prevents heat transfer from the latter to the former for higher refrigerating efficiency. Since the internal space of the heat pipe is directly in contact with part of the surface of the working material, a heat medium in the heat pipe directly touches the surface of the working material. Namely, the part of the surface of the working material serves as a condensing surface of the heat pipe, so that heat loss at the condensing surface is smaller than in the conventional heat pipe. Thus, the working material can cool the heat medium with high efficiency when it is adiabatically demagnetized. The working material is cylindrical, and the heat pipe is formed in a hollow cylinder so that part or the whole of the peripheral surface of the working material serves as the condensing surface of the heat pipe, thus providing a wide condensing surface. In this case, the thickness of the cylindrical space of the heat pipe is set to 200 to 500 microns, so that the heat medium is further restrained from moving to transfer heat from the working material to the object when the working material is adiabatically magnetized. Thus, the refrigerating efficiency of the magnetic refrigerator can be improved. According to this invention, moreover, the magnetic refrigerator does not require a transfer mechanism for the working material, and is therefore simple in construction.

DETAILED DESCRIPTION OF THE PREFERRED EMBODIMENTS

Figure 1:
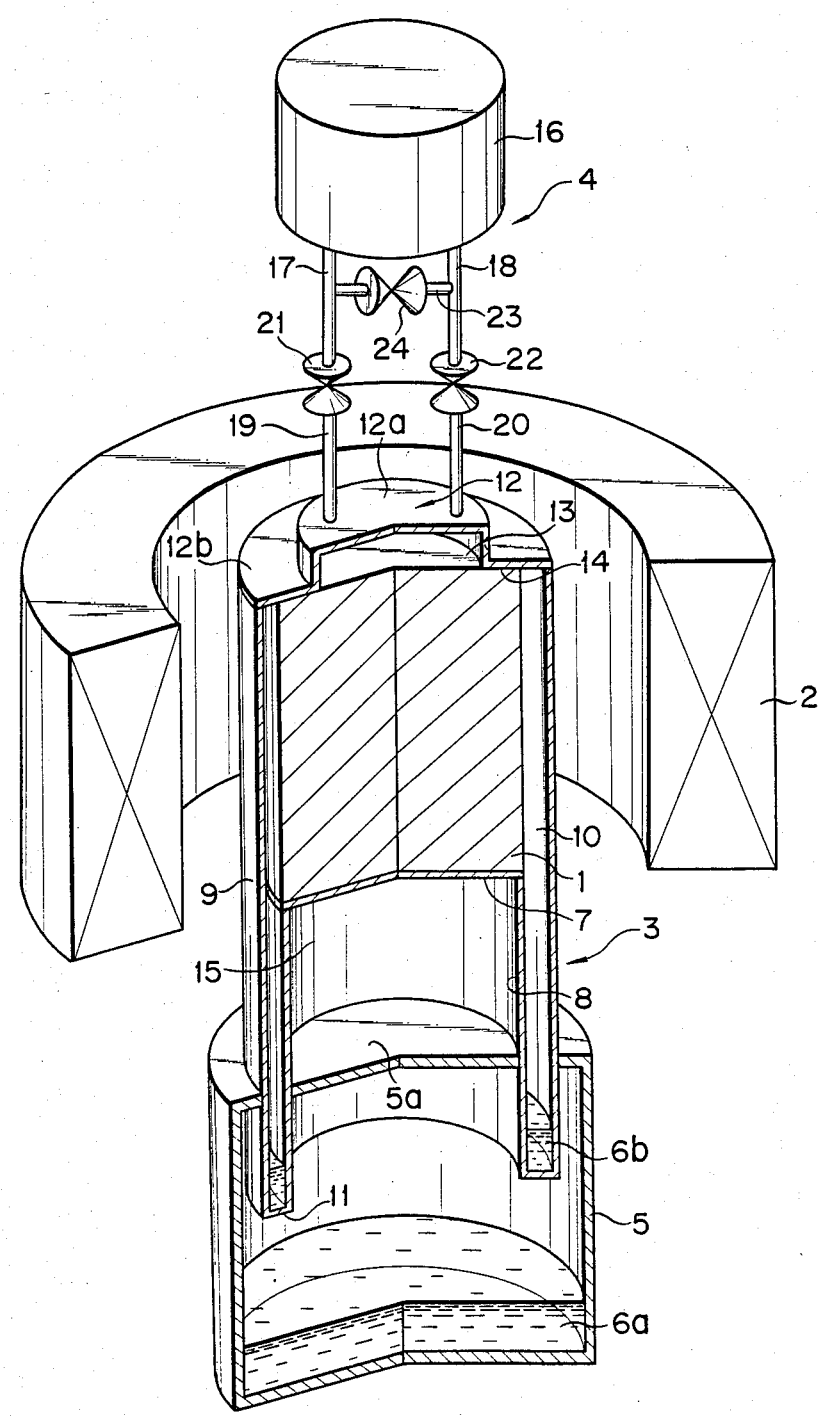
FIG. 1 is a cut away, perspective view of a magnetic refrigerator according to a first embodiment of this invention.

FIG. 1 shows a magnetic refrigerator according to one embodiment of this invention. This magnetic refrigerator is used for helium cooling, and comprises a working material 1, a superconductive coil 2, a heat pipe 3, and a heat absorbing means 4 which are located above a reservoir 5 storing helium as the object to be cooled. The working material 1, the superconductive coil 2, the heat pipe 3, and the reservoir 5 are housed in a vacuum container (not shown) and kept in a vacuum.

The reservoir 5 is in the form of a cylinder having top and bottom walls. Part of the helium is stored as liquid helium 6a in the reservoir 5, while the remaining part is hermetically kept as gaseous helium in the reservoir 5.

The working material 1 is in the form of a cylinder, and is laid on a discoid bed plate 7 so that its longitudinal direction is vertical. The working material 1 is obtained by cutting a lump of magnetic material, such as gadolinium-gallium-garnet (GGG), an alloy of erbium and nickel, $Dy_3Al_5O_{12}$, $Gd_3Al_5O_{12}$, $GdPO_4$, or $Dy_2Ti_2O_7$. After the cutting work, the resultant cylindrical body is preferably etched in an aqueous solution of phosphoric acid at approximately 160° C. By this etching process, a work distortion layer on the surface of the cylindrical body is removed to improve the thermal conductivity of the working material 1. The working material 1 radiates heat when magnetized and absorbs heat when demagnetized.

The heat pipe 3 includes coaxial inner and outer cylinders 8 and 9. The inner cylinder 8 has the same outside diameter as the diameter of the working material 1. The upper end of the inner cylinder 8 is hermetically fixed to the peripheral edge of the bed plate 7. The outer cylinder 9 is disposed coaxially with the inner cylinder 8 so as to face the respective peripheral surfaces of the working material 1 and the inner cylinder 8 at a space of approximately 200 to 500 microns therefrom.

Each of the lower ends of the outer and inner cylinders 9 and 8 is hermetically fixed to a ring-shaped bottom plate 11. A hat-shaped top plate 12 includes a projected central portion 12a in the center and a collar portion 12b around the same. The upper end of the outer cylinder 9 is hermetically fixed to the peripheral edge of the collar portion 12b. Part of the lower surface of the collar portion 12b is laid on the top face of the working material 1, and a sealing member 14 is interposed between them.

An internal space 10 of the heat pipe 3 is defined in the region where the inner peripheral surface of the outer cylinder 9 faces the outer peripheral surface of the inner cylinder 8 and the peripheral surface of the working material 1. Thus, the internal space 10 is directly in contact with the peripheral surface of the working material 1 so that the latter functions as a condensing surface of the heat pipe 3. The internal space 10 is sealed up by the sealing member 14. Helium gas is sealed in the internal space 10, and liquid helium 6b exists at the bottom portion of the internal space 10.

The lower portions of the inner and outer cylinders 8 and 9 are located in the internal space of the reservoir 5, penetrating a top plate 5a of the reservoir 5. The inner and outer cylinders 8 and 9 are hermetically fixed to the top plate 5a. A space 15 defined by the bed plate 7, the inner cylinder 8, and the top plate 5a is kept in a vacuum so that heat is prevented from being transferred from the reservoir 5 to the working material 1.

The top plate 12, the outer and inner cylinders 9 and 8, and the bed plate 7 are made of a nonmagnetic material or materials. Some of these members may be formed integrally. Alternatively, these may be manufactured by joining different materials together. More specifically, the heat exchanging capability of the heat pipe 3 can be improved by forming those portions of the inner and outer cylinders 8 and 9 which are located inside the reservoir 5 from a material with high thermal conductivity and those portions of the cylinders 8 and 9 outside the reservoir 5 from a material with low thermal conductivity.

The superconductive coil 2 is disposed concentrically with the working material 1 at a suitable distance from the outer cylinder 9 so as to surround the working material 1. The superconductive coil 2 is kept at a very low temperature, and it is intermittently supplied with current from a suitable power source (not shown). Thus, the working material 1 is repeatedly magnetized and demagnetized by the coil 2.

A cooling space 13 sealed by the sealing member 14 is defined between the central portion 12a of the top plate 12 and the top face of the working material 1. The heat absorbing means 4 provided to absorb heat from the working material 1 includes a miniature hydrogen refrigerator unit 16 located over the top plate 12. The hydrogen refrigerator unit 16 itself is of a conventional type, and produces helium gas at a temperature of 20° K. or below.

The refrigerator unit 16 has an outlet pipe 17 for supplying the helium gas as a refrigerant and an inlet pipe 18 for returning the helium gas to the refrigerator unit 16. Valves 21 and 22 for switching are provided at the extreme ends of the outlet and inlet pipes 17 and 18, respectively. Pipes 19 and 20 connect the cooling space 13 inside the top plate 12 with the valves 21 and 22, respectively.

A by-pass pipe 23 connects the outlet and inlet pipes 17 and 18, and a valve 24 for switching is disposed in the middle of the pipe 23. Thus, when the valves 21 and 22 are closed while the valve 24 is open, the helium gas from the refrigerator unit 16 circulates through the outlet pipe 17, the pipe 23, and the inlet pipe 18. When the valves 21 and 22 are open while the valve 24 is closed, on the other hand, the helium gas from the refrigerator unit 16 circulates through the outlet pipe 17, pipe 19, cooling space 13, pipe 20, and inlet pipe 18. At this time, the heat of the working material 1 is extracted by the helium gas flowing through the cooling space 13. Accordingly, if the working material 1 generates heat, the generated heat is discharged through the medium of the helium gas to restrain the temperature of the working material 1 from rising.

There will now be described the operation of the refrigerator constructed in this manner, along with the switching operation of the valves 21, 22 and 24 and energization of the coil 2. First, the valves 21 and 22 are closed, and the valve 24 is opened. Thus, the hydrogen refrigerator unit 16 is actuated to cause the helium gas at 20° K. or below to circulate through the outlet pipe 17, pipe 23, and inlet pipe 18. Since the coil 2, working material 1, heat pipe 3, and reservoir 5 are housed in the vacuum container, they are kept in an adiabatic condition, thermally disconnected from the outside.

The superconductive coil 2 is energized, then the valves 21 and 22 are opened, and the valve 24 is closed. The working material 1 is adiabatically magnetized by the coil 2 to radiate heat. This heat is extracted from the top face of the working material 1 by the helium gas at 20° K. or below flowing through the cooling space 13, and is discharged together with the helium gas. Thus, the temperature of the working material 1 is prevented from being increased by the adiabatic magnetization.

Subsequently, the valve 24 is opened, the valves 21 and 22 are closed, and the current supply to the coil 2 is stopped. As a result, application of the magnetic field to the working material 1 is interrupted to adiabatically demagnetize the working material 1, so that the temperature of the working material 1 is lowered rapidly. When the temperature of the working material 1 is lowered to the temperature of liquefaction of helium gas, i.e., 4.2° K. or below, the helium gas in the internal space 10 of the heat pipe 3 is cooled to be liquefied, and condenses on the peripheral surface of the working material 1. Drops of the condensed liquid helium are cooled to a temperature below 4.2° K., and fall into the space 10 of the heat pipe 3 to be stored as the liquid helium 6b at the lower portion of the heat pipe 3. The helium gas in the reservoir 5 is cooled by that portion of the heat pipe 3 which is located inside the reservoir 5 and stores the liquid helium 6b. The helium gas in the reservoir 5 is cooled and liquefied, and condenses on the outer surface of the heat pipe 3 inside the reservoir 5. Drops of the condensed helium fall into the reservoir 5 to be stored therein as the liquid helium 6a. Accordingly, the helium gas in the helium reservoir 5 is cooled and liquefied by the heat pipe 3. Thus, heat is transferred in one direction from the reservoir 5 toward the working material 1 through the heat pipe 3.

Thereafter, the superconductive coil 2 is energized, the valves 21 and 22 are opened, and the valve 24 is closed. The working material 1 is adiabatically magnetized by the coil 2, and is cooled by the heat absorbing means 4. Then, the valve 24 is opened, the valves 21 and 22 are closed, and the current supply to the coil 2 is stopped. As a result, the working material 1 is adiabatically demagnetized and cooled rapidly. Heat is transmitted from the reservoir 5 to the working material 1 through the space 10 of the heat pipe 3. The adiabatic magnetization and demagnetization of the working material 1 are repeated, and the helium gas and the liquid helium 6a in the reservoir 5 as the objects for cooling are cooled.

Figure 2:
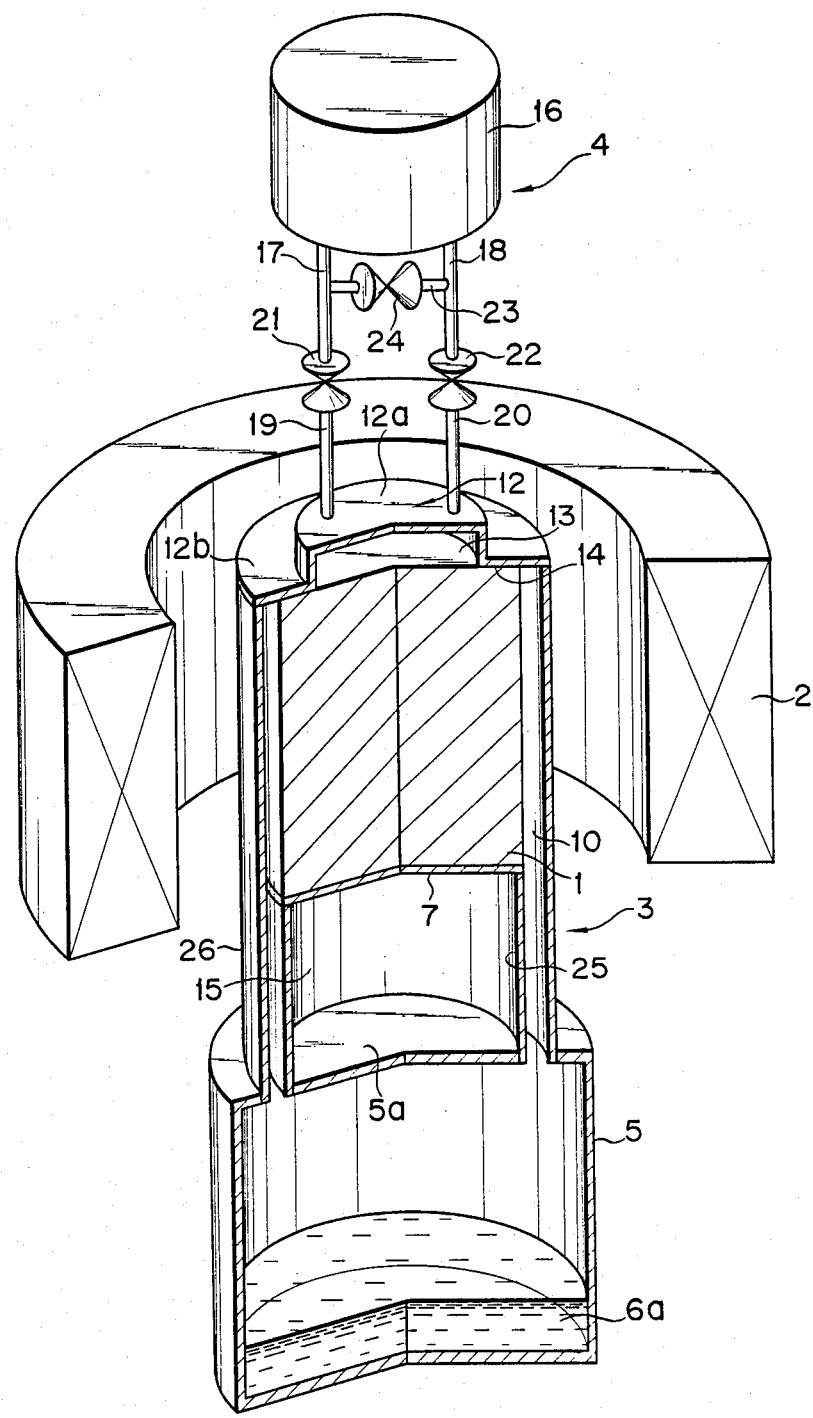
FIG. 2 is a cut away, perspective view of a magnetic refrigerator according to a second embodiment of the invention.

FIG. 2 shows a magnetic refrigerator according to another embodiment of this invention. In FIG. 2, like reference numerals are used to designate like portions shown in FIG. 1. A heat pipe 3 of this second embodiment differs from the heat pipe 3 shown in FIG. 1 in that it communicates with the interior of the reservoir 5 as the object for cooling. The lower ends of outer and inner cylinders 26 and 25 of the heat pipe 3 are fixed to the top plate 5a of the reservoir 5. The inner cylinder 25 or the top plate 5a is supported by a suitable support means (not shown). Accordingly, the internal space 10 of the heat pipe 3 is connected to the internal space of the reservoir 5. In this embodiment, helium gas or liquid helium 6a in the reservoir 5 is cooled by the same operation as in the embodiment shown in FIG. 1. According to the second embodiment, the helium gas in the reservoir 5 as the object is cooled directly by the working material 1, so that the process of heat exchange between the heat transfer medium in the heat pipe 3 and the object is unnecessary. Thus, the refrigerating efficiency of the refrigerator can further be improved.

There will now be described a method for manufacturing working material for the magnetic refrigerator according to this invention. A cylindrical block is cut from a lump of magnetic material, such as GGG (gadolinium-gallium-garnet, $Gd_3Ga_5O_{12}$), $Dy_3Al_5O_{12}$, $Gd_3Al_5O_{12}$, $GdPO_4$ or $Dy_2Ti_2O_7$, and its surface is lapped. This block is immersed in an aqueous solution of phosphoric acid kept at approximately 160° C., and is etched to be cleared of a surface layer with a thickness of approximately 50 to 60 microns. In this manner, a work distortion layer on the surface of the block can be removed easily and securely without complicating the manufacturing process. Thus, a working material for magnetic refrigeration with high thermal conductivity can be manufactured with ease.

Figure 3:
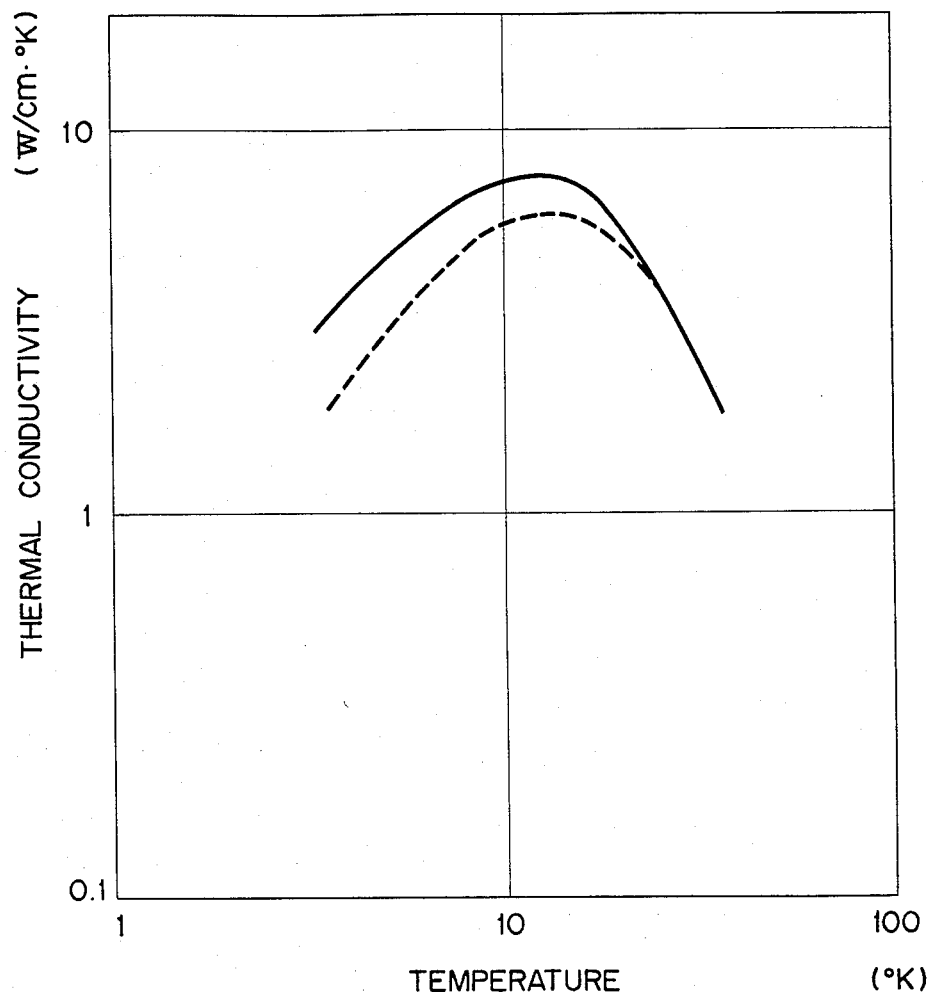
FIG. 3 is a graph showing the thermal conductivity of working materials for magnetic refrigeration.

FIG. 3 shows the temperature-induced variation of the thermal conductivity of the working material at very low temperature. In FIG. 3, a full line represents the thermal conductivity of a sample of the working material cleared of the surface work distortion layer by etching, while a broken line represents that of another sample only lapped. As seen from FIG. 3, the thermal conductivity (full line) of the etched working material is much higher than that (broken line) of the unetched working material especially in a temperature range of 20° K. and below. Thus, the very-low-temperature refrigerating efficiency of the magnetic refrigerator may be improved by the use of the working material cleared of the surface work distortion layer.

It is to be further understood by those skilled in the art that the foregoing description is for the purpose of illustrating only preferred embodiments of the invention, and that various changes and modifications may be made in the invention without departing from the spirit and scope thereof. In particular, the heat absorbing means 4 is not limited to the construction of the aforementioned embodiments in which a refrigerant (helium gas) is circulated over the top face of the working material 1 for contact cooling. For example, the magnetic refrigerator may use a heat pipe for the heat absorbing means. In this case, the condensing section of the heat pipe 3 for cooling the helium gas in the reservoir 5 is provided at the lower half portion of the peripheral surface of the working material 1, while the evaporating section of the heat pipe of the heat absorbing means 4 is provided at the upper half portion of the peripheral surface of the working material 1. The object for cooling is not limited to the gaseous body which was used in the foregoing embodiments. For example, a solid object may be cooled by bringing it into contact with the lower end portion of the heat pipe 3 according to the first embodiment. The heat pipe 3 need not always be cylindrical. Moreover, the heat pipe 3 need not always be so positioned as to extend vertically, and may be position in a slanting manner.

In the above embodiments, the working material 1 is magnetized or demagnetized by energizing or deenergizing the superconductive coil 2. Alternatively, the working material 1 may be placed in or removed from a magnetic field by periodically moving the energized coil 2 in its axial direction. Various other means than the superconductive coil may be used for applying the magnetic field to the working material 1.

What we claim is:
1. A magnetic refrigerator comprising:
    (a) a container for the object to be cooled by the refrigerator;
    (b) a working material which radiates heat when magnetized and absorbs heat when demagnetized;
    (c) a magnetic field generating means for selectively applying a magnetic field to and removing a magnetic field from said working material;
    (d) at least one heat pipe disposed between said working material and said container, said at least one heat pipe having an internal space therein through which heat is transferred from said container to said working material, said internal space being directly in contact with said working material; and
    (e) heat absorbing means for absorbing heat radiated by said working material when said working material is magnetized.

2. A magnetic refrigerator according to claim 1 wherein:
    (a) said working material is in the form of a solid cylinder and
    (b) said internal space in said at least one heat pipe is cylindrical in shape and surrounds at least part of the peripheral surface of said working material.

3. A magnetic refrigerator according to claim 2 wherein said solid cylinder is positioned vertically.

4. A magnetic refrigerator according to claim 2 wherein said at least one heat pipe comprises:
    (a) an inner cylinder which has the same outside diameter as the diameter of said working material, said inner cylinder being disposed coaxially with said working material, and (b) an outer cylinder disposed coaxially with said working material and having a larger inside diameter than the outside diameter of said working material, whereby:

(c) the inner periphery of said outer cylinder faces at least part of the peripheral surface of said working material and the outer periphery of said inner cylinder and is spaced therefrom, and (d) said cylindrical internal space is defined at least in part by said inner and outer cylinders and the peripheral surface of said working material.

5. A magnetic refrigerator according to claim 4 wherein said at least one heat pipe further comprises:
   (a) a bottom plate hermetically fixed to the lower ends of said inner and outer cylinders;
   (b) a top plate hermetically closing the upper ends of said inner and outer cylinders; and
   (c) a heat transfer medium sealed in said cylindrical internal space.

6. A magnetic refrigerator according to claim 4 wherein:
   (a) said container is adapted to contain a fluid and
   (b) said container is in fluid communication with said cylindrical internal space, whereby, during use of the refrigerator, the fluid directly touches the peripheral surface of said working material and is cooled thereby.

7. A magnetic refrigerator according to claim 4 wherein said cylindrical internal space is between 200 and 500 microns in thickness.

8. A magnetic refrigerator according to claim 2 wherein said heat absorbing means comprises:
   (a) refrigerator unit for cooling a cooling fluid and
   (b) circulating means for circulating the cooling fluid over a surface of said working material,
   whereby heat generated by said working material is removed the cooling fluid.

9. A magnetic refrigerator according to claim 8 wherein said surface of said working material is the top surface of said working material.

10. A magnetic refrigerator according to claim 8 wherein:
    (a) said top plate is hat-shaped and includes:
        (i) a central portion which is spaced from said working material and
        (ii) a collar portion which surrounds said central portion, part of the undersurface of said collar portion lying on the top surface of said working material and the peripheral edge of said collar portion being hermetically fixed to the upper end of said outer cylinder, and
    (b) the cooling fluid is caused to circulate through a cooling space which is defined in part by the lower surface of said central portion of said top plate and the top surface of said working material.

11. A magnetic refrigerator according to claim 10 wherein the cooling fluid is supplied to said cooling space when said working material is magnetized and is not supplied to said cooling space when said working material is demagnetized.

12. A magnetic refrigerator according to claim 1 wherein:
    (a) said at least one heat pipe projects into said container;
    (b) the portion of said at least one heat pipe which projects into said container is formed from a material with high thermal conductivity; and
    (c) the portion of said at least one heat pipe which does not project into said container is formed from a material with low thermal conductivity.

13. A magnetic refrigerator according to claim 1 wherein:
    (a) said at least one heat pipe is hermetically sealed and
    (b) a heat transfer medium is sealed in said internal space.

14. A magnetic refrigerator according to claim 1 wherein:
    (a) said container is adapted to contain a fluid and
    (b) the inside of said container is in fluid communication with said internal space in said at least one heat pipe,
    whereby, during use of the refrigerator, the fluid directly touches said working material and is cooled thereby.

15. A magnetic refrigerator according to claim 1 wherein said heat absorbing means comprises:
    (a) a refrigerator unit for cooling a cooling fluid and
    (b) circulating means for circulating the cooling fluid over a surface of said working material,
    whereby heat generated by said working material is removed the cooling fluid.

16. A magnetic refrigerator according to claim 15 wherein:
    (a) said heat absorbing means further comprises a cooling space which is in thermal contact with said working material and
    (b) said circulating means causes the cooling fluid to circulate through said cooling space.

17. A magnetic refrigerator according to claim 16 wherein the cooling fluid is supplied to said cooling space when said working material is magnetized and is not supplied to said cooling space when said working material is demagnetized.

* * * * *